Figure 1:
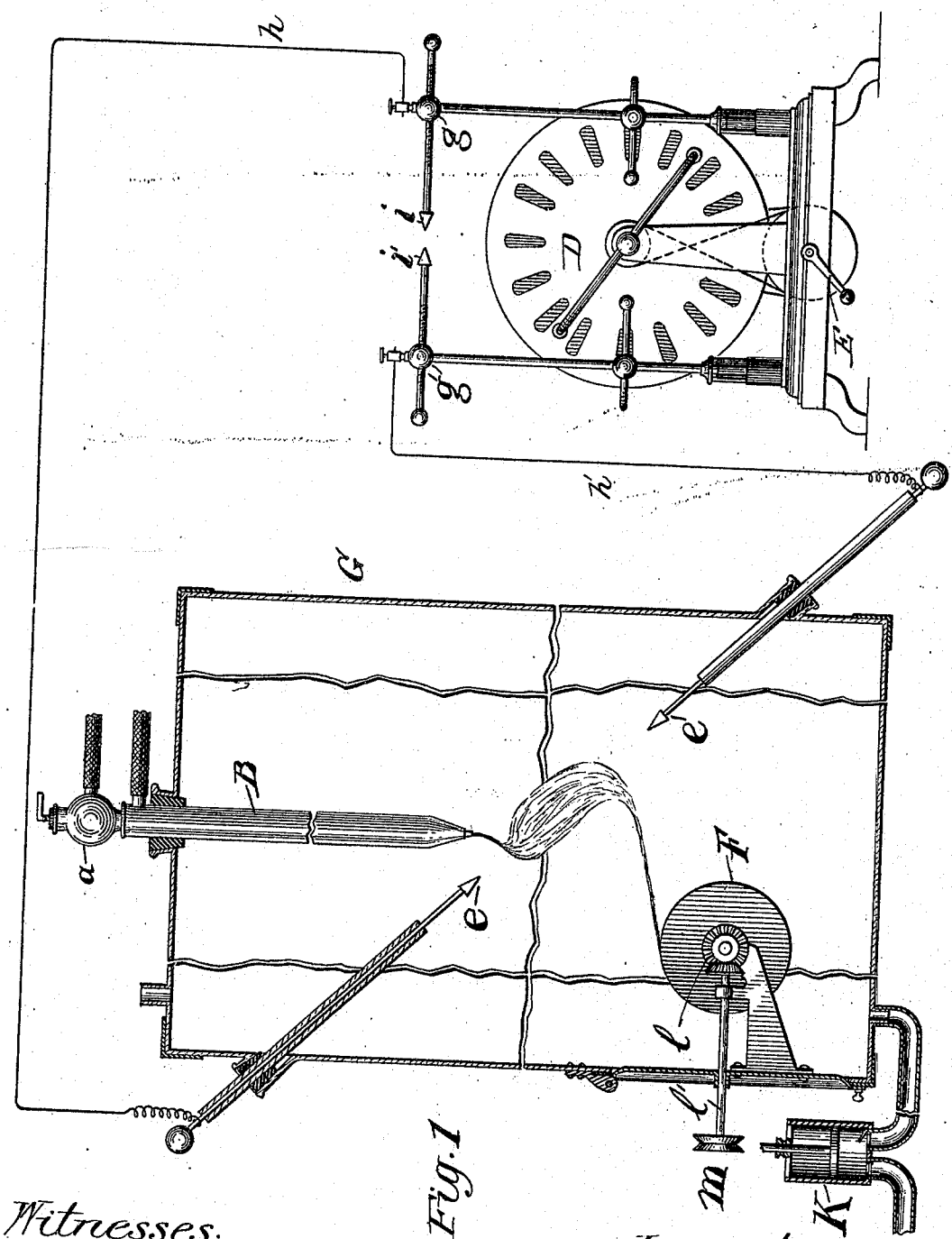

No. 745,276. PATENTED NOV. 24, 1903.
J. F. COOLEY.
ELECTRICAL METHOD OF DISPERSING FLUIDS.
APPLICATION FILED OCT. 6, 1899.
NO MODEL. 2 SHEETS—SHEET 1.

Witnesses:
O. W. Edelin
M. B. Cole

Inventor.
John F. Cooley

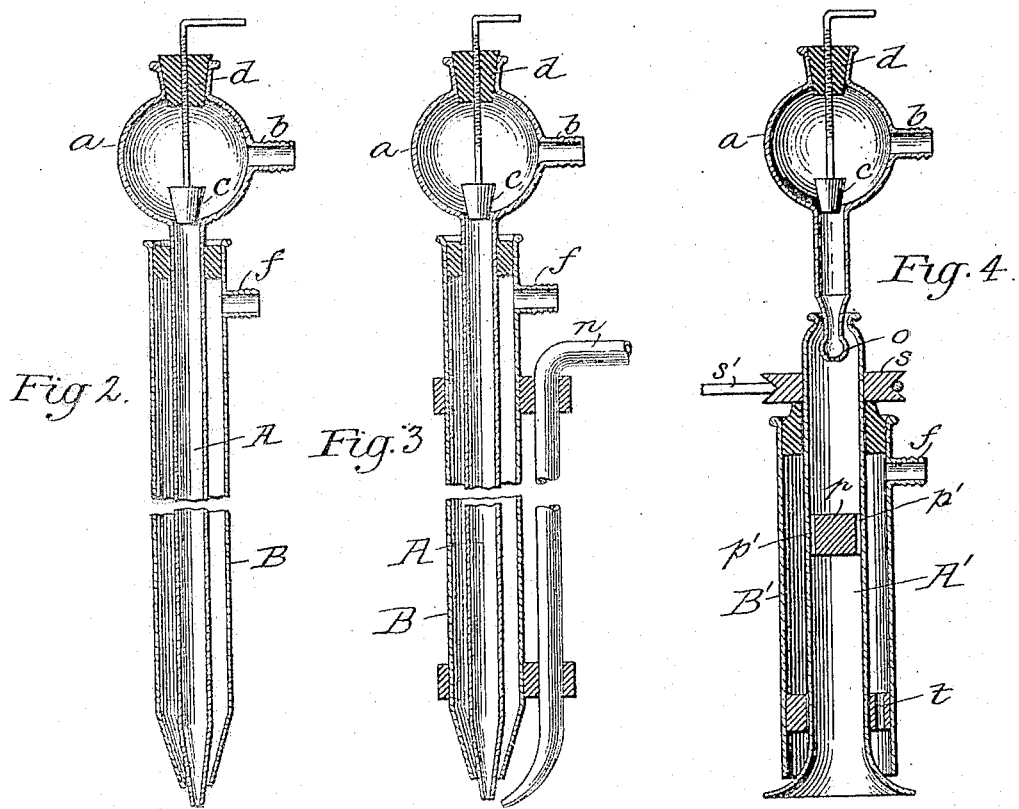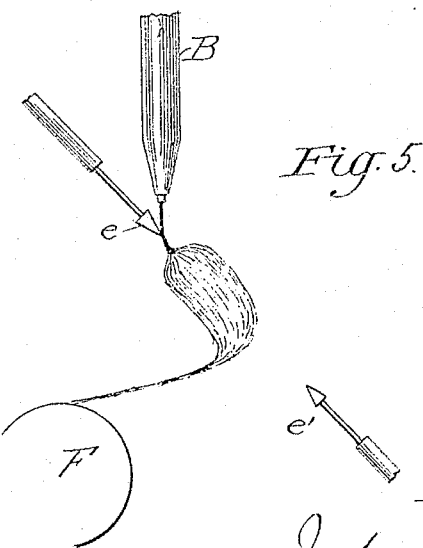

No. 745,276.

Patented November 24, 1903.

UNITED STATES PATENT OFFICE.

JOHN F. COOLEY, OF BOSTON, MASSACHUSETTS, ASSIGNOR TO CHARLES S. FARQUHAR AND AMBROSE EASTMAN, OF BOSTON, MASSACHUSETTS.

ELECTRICAL METHOD OF DISPERSING FLUIDS.

SPECIFICATION forming part of Letters Patent No. 745,276, dated November 24, 1903.

Application filed October 6, 1899. Serial No. 732,798. (No specimens.)

*To all whom it may concern:*

Be it known that I, JOHN F. COOLEY, a citizen of the United States, residing in the city of Boston, county of Suffolk, State of Massachusetts, have invented certain new and useful Improvements in Electrical Methods of Dispersing Fluids; and I do hereby declare the following to be a full, clear, and exact description of the invention, such as will enable others skilled in the art to which it appertains to make and use the same.

This my invention relates to the electrical method of dispersing fluids whereby volatile fluids are separated from their combination or association with relatively non-volatile or fixed substances in composite fluids composed thereof, resulting also in the evaporation of the volatile liquids and a state of condensation or solidification of the relatively non-volatile or fixed substances and in certain cases producing fibers and in other cases producing powders thereof.

Broadly speaking, the process is practiced by delivering the composite fluid in an attenuated form into an electrically-polarized atmospheric field produced by the convective passage through an atmospheric medium of an electric current of high tension and simultaneously supplying a solvent to said fluid.

My invention consists of a process of delivering a fluid into the path of a convective discharge of high-tension electricity and simultaneously supplying a solvent to said fluid. If a quantity of a composite fluid to be thus electrically dispersed and separated be delivered in a fine stream or streams or finely-divided state into a polarized atmospheric field or path of a convective discharge between the polar terminals of an active source of electricity of high tension, a separation of the volatile component from the fixed component occurs, and contemporaneously the fixed component is broken up or disrupted, the volatile component is evaporated, and simultaneously the fixed component is condensed or solidified. When the fixed component of the composite fluid is non-tenacious, it takes the form of a fine powder when disrupted (an example being the production of finely-powdered salts;) but when a viscous solution of a tenacious fixed substance capable of setting or hardening while in a filamentous state is delivered in the manner above mentioned to the convective discharge the volatile component is separated from the fixed component, and coinstant therewith the rapidly-condensing fixed component is broken up or disrupted into filaments by the action of the convective discharge, which are quickly dried and solidify in a fibrous condition adapted to be used for textile or other purposes, according to the nature of the fixed component.

It is preferable when employing heavy viscous composite fluids that the fluid upon which the process is to be practiced should be projected or delivered into the path or field of the convective discharge in an attenuated or finely-divided form, and it is also preferable that such delivery should be small in proportion to the intensity of the field in order that the separation of the volatile from the fixed component may be as quickly effected and complete as possible.

If the composite fluid is viscous and its non-volatile component is capable of setting or hardening upon being deprived of its solvent, such as a gelatin solution or collodion, and the electrical tension is properly graduated to the delivery of the fluid, then fine long filaments are produced by the electrical disruption of the fluid after delivery into the convective field, and the filaments of gelatin or pyroxylin will dry or set very quickly, on account of the quick separation or evaporation of the volatile component, and the electrical dispersion of these solutions usually produces multiple threads or fibers of the fixed component, and these threads or fibers set or harden and dry with great rapidity. If the stream of the fluid discharged into the electrical field is continuous, the process of disruption of the fluid is also continuous, provided the electrical convective discharge is continuous, and hence by providing a continuous delivery of fluid into the path of a continuous electrical convective discharge the operation of the production of these fibers is continuous, and the fibers may be collected mechanically—as, for instance, by reeling as fast as they are produced, or upon moving belts or forms, or upon the surface of moving water or other fluids.

The electrical action in expelling the volatile component from the composite fluid, whether the fixed component is capable of fibering or not, is increased by limiting the electrical field in which the action takes place, for by so limiting the field the convective action is more concentrated.

Fibers may be produced from suitable solutions by atomizing the fluid into the path of the convective discharge. For the production of a field of convective discharge I employ any suitable source of high-tension or static electricity—such as a Holtz or a Wimshurst static machine, a condenser, or dynamos or battery-cells connected for tension. As one solution of the production of these fibers and for subjection to the process herein described I have used with success ordinary photographic collodion (U. S. P.) which has been evaporated to about one-half its ordinary bulk. This produces excellent fibers; but I find that the fibering is somewhat improved by adding to the evaporated solution just mentioned about five per cent., by measure, of benzol, which is well mixed therewith and which seems to decrease the rapidity of its setting to a slight degree, and thus seems to allow the fibers to be attenuated by stretching under the attractive and repulsive electrical action, and so causing a reduction of the diameter of the fiber.

In the case of all solutions of solids in volatile fluids which set or harden quite easily it is desirable to keep the solution from setting or drying on or at the verge of the orifice, lip, or point from which it is delivered or projected into the convective field. I accomplish this result and maintain the fluidity at and around this point by causing a small quantity of a neutral or solvent for the fixed component of the composite fluid to flow either in a vaporous or liquid state around the composite fluid at the point of its delivery or projection into the path of convective action. For instance, I use a small stream of ordinary ether for the purpose when employing collodion solution for the production of fibers. The sheath of solvent also when thus used prevents the setting or drying of the outer surface of the stream of the fluid for a short distance from the verge of the delivering device and leaves the fluid free to be disrupted or broken up by the electrical action. If the surface of the stream at or near the verge of its delivery should not be kept soft and free to break up, the action becomes irregular, and the flow of the fluid may even be stopped entirely by the formation of a sack or lump at the point where it is delivered or projected into the field.

It is well known that where collodion or pyroxylin solutions are used for the production of fibers it is necessary to decrease the combustibility of the resulting fibers in order to produce commercial textile filaments. This combustibility may be decreased by mixing with the fibering solution a small quantity of any of several well-known substances, such as sulfate of ammonia; but it is preferable to denitrate the collodion or pyroxylin fibers by any one of several well-known chemical methods.

In the accompanying drawings, Figure 1 represents, partly in section and partly in elevation, one form of apparatus employed in carrying out my invention. Fig. 2 represents, on a larger scale and in section, the delivering device shown in Fig. 1. Fig. 3 represents a like view of a modified form of the delivering device. Fig. 4 represents a like view of a further modification thereof. Fig. 5 represents a like view to that shown in Fig. 1 of the collecting-reel, delivering device, and convective-field electrodes, the said delivering device and electrodes having a different relative position with respect to each other.

Referring to Figs. 1 and 2 of the drawings, A indicates a tube made of glass or other substance, which tube terminates at its delivery end in a small nozzle which serves as a means for delivering the fluid in a free and attenuated streaming formation into the path of convective action. The tube terminates at its upper end in an enlargement or bulb *a*, which, together with the inlet-tube *b*, serves to supply the fluid to the tube A. In order to regulate the quantity of fluid supplied to the delivery-tube A, the bulb *a* may conveniently be provided with a conical valve or plug *c*, having a screw-threaded stem passing through a stopper *d*, so that by raising or lowering the plug *c* the area of the opening governed by said plug may be correspondingly varied. The inlet-tube *b* admits the fluid to be treated under sufficient pressure to insure its delivery from the open end of the tube A in such manner as to cause it to issue in a free and attenuated streaming form into the convective field, either at a short distance from one of the electrodes, as indicated in Fig. 1, or in any intermediate position between both electrodes or in immediate or substantially immediate contact with said electrode, as indicated in Fig. 5. For the purpose of supplying a supplementary fluid to the verge of the outlet of the tube A I, may surround the tube A with an inclosing tube B and make the outlet end of the tube A (and preferably, also, the outlet end of the inclosing tube B) conical, so that by sliding the one longitudinally upon the other the area of the annular opening between their outlet ends may be correspondingly adjusted or regulated. Into the space between the two tubes I introduce the supplementary fluid, preferably a solvent of the fluid delivered through the tube A—as, for instance, when employing a solution of pyroxylin in the tube A, I may employ ether as a solvent. It will be understood, however, that in all cases it is not necessary that the supplementary fluid should be actually a solvent of the primary fluid. Thus in some cases it may be neutral to the primary fluid—as, for instance, instead of ether in the example just given it may be benzol; but in all cases the supplementary fluid preferably should be a more or less good "dielectric," as the presence of a conducting fluid while keeping the verge of delivery free may be detrimental to the disruptive and dispersive action of the convective field. The supplementary fluid or solvent may be conveniently supplied to its delivery-tube B through the branch $f$ from any convenient reservoir.

D represents one form of electric-current generator, such as a Wimshurst machine, for the production of high tension or static electricity, $g$ being the positive pole thereof and $g'$ the negative pole, or conversely. A crank E is provided, by which the machine may be operated as usual, although a pulley with a belt or cord may be used. The pole $g$ is connected by a wire $h$ with the adjustable electrode $e$, and the other pole, $g'$, is connected by a wire $h'$ with the adjustable electrode $e'$, as shown, so that by adjusting the distance between the free ends of the electrodes $e\,e'$ a variation of strength of the convective field between them may be correspondingly established. To render this regulation of the strength of the convective field still more effective, I provide as one way of accomplishing this end the supplementary electrodes $i\,i'$, adjustable toward and from each other, whereby the convective field between the electrodes $e\,e'$ may be short-circuited to a greater or less extent, according to the regulation of the length, and consequently the resistance of the convective field formed across $i\,i'$, caused by adjustment of the distance between them. The electrodes $e\,e'$ are suitably insulated, so that the field of convective action shall be limited to the space between them. The conductors $h\,h'$ should also be heavily insulated and kept at some distance from the field. Adjacent to but in this instance outside of the field of convective action is arranged one form of collecting mechanism for progressively withdrawing fibers produced by the convective action. This collecting mechanism may conveniently consist of a reel F, provided with means for imparting to it a continuous rotation—as, for instance, the bevel-gearing $l$, operated from a counter-shaft $l'$ and driving-pulley $m$. It is best also that the whole device be inclosed in a case G of any suitable size, as indicated by the broken lines in Fig. 1, so that currents of air may be avoided and so that by the use of suitable drying substances or mechanisms the electrical and atmospheric conditions within the case may be kept practically uniform; but more especially when the redemption of the dispersed volatile liquid products is desirable—as, for instance, when collodion is used for the production of fibers—the before-mentioned dispersed solvents may be drawn off from the interior of the case, accompanied by a portion of the gaseous atmospheric contents of the case G—for instance, by the pump K—and the dispersed solvents may be recondensed in any suitable manner, and whatever other vapors may be produced in working my process may be drawn off in like manner and fresh atmospheric or gaseous media substituted.

When the liquid—as, for instance, collodion—is delivered in an attenuated form—as, for instance, in a succession of small drops or spray, as in the spray-delivery, Fig. 3, or in a thin stream, Fig. 2, or multiple streams or sheet, Fig. 4—from the discharge-verge of the delivery device and the electrical machine is operated, the fluid falls freely into the convective field between the terminals $e\,e'$, and the electrical action causes filaments to start out, which quickly set or harden because of the dispersion of their volatile liquid component and form fibers which separate, being mutually repelled, and are attracted by the point $e'$; but before the fibers can touch the point $e'$ they are caught and are carried to the reel F, upon which the fibers are wound in a machine like the one herein illustrated. The fibers may be caught by the operator, ordinarily by means of a glass rod, and are carried to the reel, so that the reeling may begin. If the reeling is continuous, it occasionally happens that from some cause the fibers may break away from their connection with the reel, and in that case they may again be caught and carried to the reel in order that the collecting may continue.

It will be understood that instead of a static machine, such as a Wimshurst or Holtz machine, I may employ for the production of the convective field any other suitable equivalent source of high-tension or static electricity appropriate to the purpose.

In the delivering device shown in Fig. 3 the construction is identical with that shown in Fig. 2, but with the additional feature of a spraying-tube $n$ for directing a jet of steam, compressed air, or the like across the outlet-opening of the tube A, producing one form of attenuated delivery into the field suitable for the practice of this process.

In the delivering device shown in Fig. 4 the fluid supplied to the bulb $a$ flows through the exit-opening $o$ upon an abutment $p$, provided with peripheral apertures $p'$. Said abutment is contained within a hollow tube A', which receives a motion of rotation from a pulley $s$ and band $s'$ and is incased by an outer tube B' for the reception of the solvent. The tube A' is provided with an enlarged bell-shaped mouth, as shown. As the tube A' is rotated the fluid supplied from the bulb $a$ drops upon the abutment $p$, from which it passes through the apertures $p'$ to the inner periphery of the tube A' and thence downward to the bell-shaped end thereof, where it is thrown off by centrifugal force into the convective field of discharge. At the same time the solvent or other fluid may be conducted through the casing B' and aperture t to the outer periphery of the bell-mouthed exit, whereby the edges thereof are always maintained in operative condition. It will be noted that in this latter form the material is delivered into the field of convective action in the form of a thin sheet which breaks up into streams or drops, whose dimensions may be graduated by varying the amount of fluid supplied to the tube A'. The quantity of supplementary fluid supplied may also be varied by adjusting the tube B' so as to vary the distance of the lower edge of said tube B' from the upper surface of the bell-mouthed end of the tube A', as will be readily understood.

By the word "attenuated" as employed herein and in the claims I refer to dimensions or configuration and not to the condition of fluidity of the fluid as it is delivered into the convective field. The phenomena resulting from the convective passage of a current of electricity at high tension through a gaseous medium commonly called "silent discharge," "brush discharge," "spray discharge" is herein referred to as "convective field," "field of convective action," "convective discharge," and "convective action."

Having thus described my invention, what I claim is—

1. The process of separating from composite fluids the volatile component and breaking up the fixed component thereof, which consists in delivering the composite fluid into the path of a convective discharge of high-tension electricity, and simultaneously supplying a solvent to said fluid, disrupting the solution or emulsion by said discharge, evaporating the volatile component and simultaneously solidifying the disrupted fixed component, substantially as described.

2. The process of separating from composite fluids the volatile component and breaking up the fixed component thereof, which consists in projecting the composite fluid into the path of a convective discharge of high-tension electricity and simultaneously supplying a solvent to said fluid, disrupting the composite fluid by said discharge, evaporating the volatile component and simultaneously solidifying the disrupted fixed component, substantially as described.

3. The process of separating from composite fluids the volatile component and fibering the fixed component thereof, which consists in delivering the composite fluid in a viscous condition into the path of a convective discharge of high-tension electricity, and simultaneously supplying a solvent to said composite fluid, breaking up or disrupting the viscous fluid by said discharge, evaporating the volatile component and simultaneously solidifying the fixed component into multiple fibers, substantially as described.

4. The process of separating from composite fluids the volatile component and fibering the fixed component thereof, which consists in projecting the composite fluid in a viscous condition into the path of a convective discharge of high-tension electricity, and simultaneously supplying a solvent to said composite fluid, breaking up or disrupting the viscous fluid by said discharge, evaporating the volatile component and simultaneously solidifying the fixed component into multiple fibers, substantially as described.

5. The method of electrically separating the fixed component from the volatile component of composite fluids, and disrupting the fixed component thereof, which consists in delivering the composite fluid into a medium wherein the same is free to move and simultaneously supplying a solvent thereto, and there subjecting the composite fluid to a convective discharge of high-tension electricity, substantially as described.

6. The process of separating the volatile liquid component from the component of fixed substances in composite fluids composed thereof, which consists in conducting a supply of the composite fluid to a field of convective action of high-tension electricity, causing a delivery of the said composite fluid in a free and attenuated form therein, investing the composite fluid with a supplementary fluid at the verge of its liberation into the convective field, then disrupting the composite fluid by the action of the convective field thereon, and collecting the separated products of the fixed substances resulting from the disruptive action of the convective field upon the composite fluid.

In testimony whereof I affix my signature in presence of two witnesses.

JOHN F. COOLEY.

Witnesses:
M. B. COLE,
ALEXANDER S. STEUART.